US012157823B2

(12) United States Patent
Fleischel et al.

(10) Patent No.: US 12,157,823 B2
(45) Date of Patent: *Dec. 3, 2024

(54) ASPHALT COMPOSITION COMPRISING MONOMERIC MDI AS THERMOSETTING REACTIVE COMPOUND

(71) Applicant: BASF SE, Ludwigshafen am Rhein (DE)

(72) Inventors: Olivier Fleischel, Ludwigshafen am Rhein (DE); Michael Praw, Wyandotte, MI (US); Waldemar Schatz, Lemfoerde (DE); Bernie Lewis Malonson, Wyandotte, MI (US); Iran Otero Martinez, Lemfoerde (DE); Dag Wiebelhaus, Ludwigshafen am Rhein (DE)

(73) Assignee: BASF SE (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/414,580

(22) PCT Filed: Dec. 9, 2019

(86) PCT No.: PCT/EP2019/084132
§ 371 (c)(1),
(2) Date: Jun. 16, 2021

(87) PCT Pub. No.: WO2020/126585
PCT Pub. Date: Jun. 25, 2020

(65) Prior Publication Data
US 2022/0056272 A1 Feb. 24, 2022

(30) Foreign Application Priority Data
Dec. 18, 2018 (EP) .................... 18213338

(51) Int. Cl.
C08L 95/00 (2006.01)
C08G 18/76 (2006.01)
C08K 5/29 (2006.01)

(52) U.S. Cl.
CPC .......... C08L 95/00 (2013.01); C08G 18/7657 (2013.01); C08K 5/29 (2013.01)

(58) Field of Classification Search
CPC ............... C08L 95/00; C08L 2555/20; C08L 2555/22; C08L 2555/40; C08G 18/7657; C08G 18/6476; C08G 18/725; C08G 18/7671; C08G 18/797; C08G 2190/00; Y02A 30/30
See application file for complete search history.

(56) References Cited

U.S. PATENT DOCUMENTS

| 3,650,791 | A | 3/1972 | Fauber |
| 4,199,524 | A | 4/1980 | Schaaf et al. |
| 6,271,305 | B1 * | 8/2001 | Rajalingam ........ C08G 18/6505 524/705 |
| 11,059,749 | B2 * | 7/2021 | Fleischel ................ C04B 26/26 |
| 2015/0240082 | A1 | 8/2015 | Smith et al. |
| 2015/0274974 | A1 * | 10/2015 | Bhatnagar .......... C08G 18/6476 524/705 |
| 2016/0083585 | A1 * | 3/2016 | Yoshino ................ C08G 18/69 524/59 |
| 2017/0226343 | A1 | 8/2017 | Kim |
| 2022/0056272 | A1 * | 2/2022 | Fleischel ............. C08G 18/797 |

FOREIGN PATENT DOCUMENTS

| CA | 779373 A | 2/1968 |
| EP | 0537638 A1 | 4/1993 |
| FI | 67719 B | 1/1985 |
| JP | 61-126125 A | 6/1986 |
| JP | 02-302480 A | 12/1990 |
| JP | 10-017845 A | 1/1998 |
| JP | 2014-227527 A | 12/2014 |
| WO | 01/30911 A1 | 5/2001 |
| WO | 01/30912 A1 | 5/2001 |
| WO | 01/30913 A1 | 5/2001 |

OTHER PUBLICATIONS

Anonymous: "Dow ISONATE(TM) and PAPI (TM) Pure, Modified and Polymeric MDI Handling & Storage Guide", Oct. 1, 2009, pp. 1-56.
Anonymous: "Lupranate 81 Isocyanate Lupranate MM103, Lupranate 5143 Isocyanate, Technical Bulletins", Jan. 1, 2019, pp. 1-6.
European Search Report for EP Patent Application No. 18213338.9, Issued on May 9, 2019, 5 pages.
International Preliminary Report on Patentability received for PCT Patent Application No. PCT/EP2019/084132, mailed on Jul. 1, 2021, 12 pages.
International Search Report and Written Opinion received for PCT Patent Application No. PCT/EP2019/084132, mailed on Feb. 18, 2020, 14 pages.
Ortega et al., "Physico-chemistry control of the linear viscoelastic behaviour of bitumen/montmorillonite/MDI ternary composites: Effect of the modification sequence", Fuel Processing Technology, vol. 143, Dec. 10, 2015, pp. 195-203.
Skok et al., "New modified liquid pure MDI for CASE applications", Jan. 1, 2007, pp. 1-9.

* cited by examiner

Primary Examiner — Frances Tischler
Assistant Examiner — Gennadiy Mesh
(74) Attorney, Agent, or Firm — Faegre Drinker Biddle & Reath LLP

(57) ABSTRACT

An asphalt composition comprising 0.1 to 10.0 wt.-% monomeric methylene diphenyl diisocyanate (MDI) based on the total weight of the composition, wherein the monomeric MDI is carbodiimide modified and wherein the weight percentage of 4,4'-MDI in the carbodiimide modified monomeric MDI is in the range of from 65 to 85% and the weight percentage of carbodiimide is in the range of from 15 to 35% in the carbodiimide modified monomeric MDI; wherein at least 18% by weight based on the total weight of the composition are particles with a sedimentation coefficient above 5000 Sved in a white spirit solvent.

15 Claims, No Drawings

ASPHALT COMPOSITION COMPRISING MONOMERIC MDI AS THERMOSETTING REACTIVE COMPOUND

CROSS-REFERENCE TO RELATED APPLICATIONS

This application is a national stage application (under 35 U.S.C. § 371) of PCT/EP2019/084132, filed Dec. 9, 2019, which claims benefit of European Application No. 18213338.9, filed Dec. 18, 2018, both of which are incorporated herein by reference in their entirety.

This invention essentially relates to an asphalt composition comprising monomeric MDI as thermosetting reactive compound.

The present invention also relates to a process for the preparation of an asphalt composition. The asphalt composition of the present invention shows an increase in the functional temperature range, better storage stability at high temperature and improved deformation resistance properties of the asphalt as for example the useful temperature range of the asphalt, increased elasticity and a lower potential of deformation.

In general asphalt is a colloidal material containing different molecular species classified into asphaltenes and maltenes. Asphalt being viscoelastic and thermoplastic suffers property varia-tion over a range of temperatures, from extreme cold to extreme heat. Asphalt tends to soften in hot weather and crack in extreme cold. At cold temperatures, asphalts become brittle and are subject to crack while at elevated temperatures they soften and lose physical properties.

The addition of a thermosetting reactive component as binders respectively in more general terms as modifier allows the physical properties of the asphalt to remain more constant over a range of temperatures and/or improve the physical properties over the temperature range the asphalt is subjected to.

Such asphalts that are modified by added binders respectively modifiers are known for years in the state of the art. But there is still a need in the asphalt industry, however, for improved asphalts. In part this is because currently known polymer-modified asphalts have a number of de-ficiencies. These include susceptibility to for instance permanent deformation (rutting), flexural fatigue, moisture, decrease of elasticity at low temperature operation.

WO 01/30911 A1 discloses an asphalt composition comprising, by weight based on the total weight of the composition, about 1 to 8%, of a polymeric MDI, where the polymeric MDI has a functionality of at least 2.5. It also relates to a process for preparing said asphalt composition, using reaction times of below 2 hours. The formation of the product MDI-asphalt is measured by an increase in the product's viscosity or more preferably by dynamic mechanical analysis (DMA).

WO 01/30912 A1 discloses an aqueous asphalt emulsion comprising, besides asphalt and water, an emulsifiable polyisocyanate. It also relates to an aggregate composition comprising said emulsion, and to processes for preparing said compositions WO 01/30913 A1 discloses an asphalt composition comprising, by weight based on the total weight of the composition, about 1 to 5%, of a polymeric MDI based prepolymer, where the polymeric MDI has a functionality of at least 2.5. It also relates to a process for preparing said asphalt composition.

EP 0 537 638 B1 discloses polymer modified bitumen compositions which contain 0.5 to 10 parts by weight of functionalized polyoctenamer to 100 parts by weight of bitumen and, optional-ly, crosslinking agents characterized in that the polyoctenamer is predominantly a trans-polyoctenamer and contains carboxyl groups, as well as groups derived therefrom for example maleic acid.

Consequently, it would be highly desirable to have an asphalt composition and a related preparation process at hand which could avoid all the disadvantages associated with the prior art, for example limited useful temperature interval, limited elastic response and low softening point.

One of the objects of the present invention was to provide an asphalt composition showing improved physical properties in terms of being more constant over a range of temperatures and having a better storage stability at high temperature. Furthermore, an asphalt composition was sought that shows an increase in the useful temperature interval (UTI), reduces the non-recoverable creep compliance (Jnr), has an increased elastic response, has an increased load rating, has a reduced potential for permanent asphalt deformations in situations of increased traffic levels respectively reduced speeds.

Furthermore, a respective asphalt composition preparation process was to be provided.

The different physical properties of the asphalt composition are measured by different tests known in the art and described in detail in the experimental section.

Elastic response and non-recoverable creep compliance (Jnr) are computed in in the Multiple Stress Creep Recovery (MSCR) test in which the asphalt is subjected to a constant load for a fixed time. The total deformation for a specific period of time is given in % and correspond to a measure of the elasticity of the binder. In addition the phase angle may be measured which illustrates the improved elastic response (reduced phase angles) of the modified binder.

Accordingly, an asphalt composition was found comprising 0.1 to 10.0 wt.-% monomeric MDI based on the total weight of the composition.

According to a further aspect of the invention there is provided a process for the preparation of an asphalt composition comprising the following steps:
a) Heating up the starting asphalt to a temperature of from 110 to 190° C.
b) Adding the desired amount of monomeric MDI as thermosetting reactive compound under stirring
c) After step b) the reaction mixture is stirred at a temperature in the range of from 110 to 190° C. for at least 2,5 h
wherein the reaction is under an oxygen atmosphere, which fulfills the objects of the invention. In addition there is provided the use of an asphalt composition for the preparation of an asphalt mix composition.

Surprisingly, it could be found that an asphalt composition according to the invention is showing an increased useful temperature interval, an increased elastic response, a good adhesion and an increased load rating as well as a reduced potential for permanent asphalt deformations.

Without being bound to this theory it is presently believed that a specific morphology of colloid structures is needed to obtain the resulting performances. A thermosetting reactive compound will react with the phenolic, carboxylic, thiol, anhydride and/or pyrrolic group or any reactive group from the asphalt components and link the asphaltenes together, leading to larger particles in the resulting asphalt composition.

Preferred embodiments are explained in the claims and the specification. It is understood that combinations of preferred embodiments are within the scope of the present invention.

According to the invention, the asphalt composition comprises monomeric MDI as thermosetting reactive compound.

Generally, an asphalt used in the present invention can be any asphalt known and generally covers any bituminous compound. It can be any of the materials referred to as bitumen or asphalt.

For example distillate, blown, high vacuum and cut-back bitumen, and also for example asphalt concrete, cast asphalt, asphalt mastic and natural asphalt. For example, a directly distilled asphalt may be used, having, for example, a penetration of 80/100 or 180/220. For example, the asphalt can be free of fly ash.

Preferably the asphalt has a penetration of 20-30, 30-45, 35-50, 40-60, 50-70, 70-100, 100-150, 160-220, 250-330 or performance grades of 52-16, 52-22, 52-28, 52-34, 52-40, 58-16, 58-22, 58-28, 58-34, 58-40, 64-16, 64-22, 64-28, 64-34, 64-40, 70-16, 70-22, 70-28, 70-34, 70-40, 76-16, 76-22, 76-28, 76-34, 76-40, more preferably the asphalt has a penetration of 30-45, 35-50, 40-60, 50-70, 70-100, 100-150, 160-220 or performance grades of 52-16, 52-22, 52-28, 52-34, 52-40, 58-16, 58-22, 58-28, 58-34, 58-40, 64-16, 64-22, 64-28, 64-34, 70-16, 70-22, 70-28, 76-16, 76-22, most preferably the asphalt has a penetration 40-60, 50-70, 70-100, 100-150 or performance grades of 52-16, 52-22, 52-28, 52-34, 52-40, 58-16, 58-22, 58-28, 58-34, 64-16, 64-22, 64-28, 70-16, 70-22, 76-16, 76-22.

Generally, a thermosetting reactive compound is a compound which could chemically react with the different molecular species classified into asphaltenes and maltenes of the respective asphalt and helps to generate a specific morphology of colloid structures resulting in physical properties of the asphalt to remain more constant over a broad range of temperatures and/or even improve the physical properties over the temperature range the asphalt is subjected to.

The thermosetting reactive compound according to the invention is a monomeric MDI.

Generally, monomeric MDI (mMDI) is known in the art and is known as methylene diphenyl diisocyanate. It may occur in form of different isomers like for example 4,4'-, 2,2'- and 2,4'-isomers. According to the invention any of the known isomers or mixtures of different isomers of mMDI can be used, provided it is compatible with the asphalt. Preferably it is pure 4,4-MDI, a mixture of 2,4-MDI and 4,4-MDI, a mixture of 2,4-MDI and 4,4-MDI with reduced 2,2'-MDI content, more preferably it is pure 4,4-MDI, a mixture of 2,4'-MDI and 4,4-MDI, most preferably it is pure 4,4-MDI. Preferably the amount of 4,4'MDI isomers is in the range of from 40 to 99.5%, more preferably in the range of from 44% to 99%, most preferably in the range of from 46% to 98.5%.

It can also comprise modified variants containing carbodiimide, uretonimine, isocyanurate, ure-thane, allophanate, urea or biuret groups. Preferably the modified variants according to the invention are carbodiimide modified monomeric MDI's. More preferably the carbodiimide modified monomeric MDI is a mixture of 4,4-MDI and carbodiimide modified monomeric MDI. Preferably the weight percentage of 4,4-MDI in the carbodiimide modified monomeric MDI is in the range of from 65 to 85% and the weight percentage of carbodiimide is in the range of from 15 to 35% in the carbodiimide modified monomeric MDI. More preferably the weight percentage of 4,4'-MDI in the carbodiimide modified monomeric MDI is in the range of from 70 to 80% and the weight percentage of carbodiimide is in the range of from 20 to 30% in the carbodiimide modified monomeric MDI. Preferably the mMDI used according to the invention has an average iso-cyanate functionality of at least 2.0, more preferably of at least 2.1, most preferably of at least 2.15, for example 2.2, 2.3 or 2.4. This all will be referred to in the following as monomeric MDI or mMDI.

To adjust the physical properties of the respective mMDI also other isocyanates, polymeric isocyanates and/or prepolymers can be added.

According to the invention the amount of the monomeric MDI as thermosetting reactive compound in the asphalt composition is not more than 10.0 wt. % based on the total weight of the asphalt composition. Preferably not more than 5.0 wt. %, more preferably not more than 4.0 wt. %, most preferably not more than 3.0 wt. %, based on the total weight of the asphalt composition. According to the invention, the amount of the monomeric MDI as thermosetting reactive compound in the asphalt composition is at least 0.1 wt. %, preferably at least 0.5 wt. %, more preferably at least 0.7 wt. %, most preferably at least 0.9 wt. % based on the total weight of the asphalt composition. For example the amount of the monomeric MDI as thermosetting reactive compound in the asphalt composition can be in the range of from 0.5 wt. % to 1.8 wt. %, in the range of from 0.8 wt. % to 1.7 wt. %, in the range of from 1.0 wt. % to 1.9 wt. %, in the range of from 1.1 wt. % to 2.0 wt. %, in the range of from 1.8 wt. % to 3.2 wt. %, in the range of from 2.1 wt. % to 3.7 wt. %, or in the range of from 0.5 wt. % to 2.5 wt. %.

Generally, the amount of the monomeric MDI as thermosetting reactive compound may depend on the composition of the respective asphalt. For hard asphalt having a needle penetration below 85 less monomeric MDI as thermosetting reactive compound may be needed and for soft asphalt having a needle penetration above 85 a larger amount of the respective monomeric MDI as thermosetting reactive compound may be needed. Without being bound to this theory it is presently believed that the amount of the respective monomeric MDI as thermosetting reactive compound needs to be readjusted due to the different concentration of polar components (which include asphaltene), also called n-heptan insoluble, in different asphalts. In soft asphalts which corresponds to a needle penetration above 85, asphaltenes are diluted, hence lower con-centrated, which require a larger amount of the respective monomeric MDI as thermosetting reactive compound and more oxidation, which can be supplied by the oxygen atmosphere of the preparation process of an asphalt composition, to achieve better performance.

Generally, for asphalt having a needle penetration below 85 which corresponds to a perfomance grade having a high temperature limit of at least 64, the amount of the respective monomeric MDI as thermosetting reactive compound in the asphalt composition can be in the range of from 0.1 to 3.0 wt % preferably the amount of the monomeric MDI as thermosetting reactive compound is not more than 2.5 wt %, most preferably not more than 2.3 wt %, particularly not more than 2.0 wt % and the amount of the monomeric MDI as thermosetting reactive is at least 0.1 wt. %, preferably at least 0.5 wt. %, more preferably at least 0.7 wt. %, most preferably at least 1.0 wt. % based on the total weight of the asphalt composition.

Generally, for asphalt having a needle penetration above 85 which correspond to a perfomance grade having a high temperature limit of 64 or below, the amount of the monomeric MDI as thermosetting reactive compound in the asphalt composition can be in the range of from 2.0 wt. % to 10.0 wt %, preferably the amount of the monomeric MDI as thermosetting reactive compound is not more than 5.0 wt %, most preferably not more than 4.5 wt %, particularly not more than 4.0 wt % and the amount of the monomeric MDI as thermosetting reactive compound is at least 2.0 wt. %, preferably at least 2.5 wt. %, more preferably at least 2.7 wt. %, most preferably at least 3.0 wt. % based on the total weight of the asphalt composition.

Generally, by modifying an asphalt the performance in terms of different physical properties may be improved for example an increased elastic response can be achieved.

By using the asphalt composition according to the invention a shift from one grade to another grade can be achieved. For example the modification of an asphalt pen 50/70 results in a polymer modified asphalt 25/55-55A using 2 wt. % of monomeric MDI as thermosetting reactive compound or in a harder grade like a pen 20/30 or 30/45 depending on the respective amount of the respective monomeric MDI as thermosetting reactive compound. The same applies to an asphalt with a pen 70-100 being transformed to a pen 50-70 for example with 2 wt.-% of monomeric MDI as thermosetting reactive compound or to a PmB 25/55-55A with 3 wt.-% of monomeric MDI as thermosetting reactive compound. Also for the performance grade a shift in a higher grade is achievable for example a PG 64-22 results in a PG70-22 after modification with 2 wt.-% of the respective monomeric MDI as thermosetting reactive compound as for example a carbodiimide modified monomeric MDI, for example a mixture of 4,4-MDI and carbodiimide modified monomeric MDI.

The properties of the asphalt composition according to the invention respectively, such as an increased useful temperature interval, an increased elastic response, a good adhesion and an increased load rating as well as a reduced potential for permanent asphalt deformations, may depend on the particle concentration with a specific sedimentation coefficient, which is directly correlated to the particle size, of the corresponding composition.

According to the invention the asphalt composition has at least 18% by weight based on the total weight of the composition particles with a sedimentation coefficient above 5000 Sved in a white spirit solvent. More preferably 20% by weight based on the total weight of the composition particles with a sedimentation coefficient above 5000 Sved in a white spirit solvent, most preferably at least 23% by weight based on the total weight of the composition particles with a sedimentation coefficient above 5000 Sved in a white spirit solvent, particles with a sedimentation coefficient above 5000 Sved in a white spirit solvent can be up to 100% by weight based on the total weight of the composition, preferably the amount of particles with a sedimentation coefficient above 5000 Sved in a white spirit solvent is not more than 95% by weight based on the total weight of the composition, more preferably not more than 90% by weight based on the total weight of the composition, most preferably not more than 80% by weight based on the total weight of the composition. For example 18% to 75% by weight based on the total weight of the composition particles with a sedimentation coefficient in the range of from 15000 to 170000 Sved in a white spirit solvent, for example 23% to 65% by weight based on the total weight of the composition particles with a sedimentation coefficient in the range of from 25000 to 140000 Sved in a white spirit solvent or for example 30% to 52% by weight based on the total weight of the composition particles with a sedimentation coefficient in the range of from 22000 to 95000 Sved in a white spirit solvent.

White spirit solvent in the context of the present invention means white spirit high-boiling petro-leum with the CAS-Nr.: 64742-82-1, having 18% aromatics basis and a boiling point of from 180 to 220° C.

The sedimentation coefficient was detected by ultracentrifugation combined to absorption optical devices. The sedimentation and concentration of each component were measured with a wavelength of 350 nm. This method is known in the art and described in detail in the experimental section.

The asphalt compositions of the present invention can be used as any classical asphalt compositions of the prior art. The asphalt compositions of the invention can notably be useful for the production of:
  paints and coatings, particularly for waterproofing,
  mastics for filling joints and sealing cracks
  grouts and hot-poured surfaces for surfacing of roads, aerodromes, sports grounds, etc.
  in admixture with stone to provide aggregates (comprising about 5-20% of the asphalt composition) e.g. asphalt mix hot coatings for surfacing as above
  surface coatings for surfacing as above
  warm mix asphalt (WMA)
  hot mix asphalt (HMA)

Furthermore, the present invention relates to a process for the preparation of an asphalt composition according to the invention, comprising the following steps
  a) Heating up the starting asphalt to a temperature of from 110 to 190° C.
  b) Adding the desired amount of monomeric MDI as thermosetting reactive compound under stirring
  c) After step b) the reaction mixture is stirred at a temperature in the range of from 110 to 190° C. for at least 2,5 h wherein the reaction is under an oxygen atmosphere.

For example the process of the invention may be performed at a temperature of from 110 to 190° C. in step a) and or step c). Preferably the temperature is in the range of from 110 to 180° C., more preferably in the range of from 115 to 170° C., most preferably in the range of from 120 to 155° C., for example the temperature is in the range of from 121 to 152° C.

Generally the temperatures in step a), b) and step c) are in the range of from 110 to 190° C. and may differ in every step. Preferably, the temperature in every of the three steps is the same and in the range of from 110 to 190° C., more preferably the same and in the range of from 110° C. to 170° C., most preferably the same and in the range of from 110° C. to 160° C.

According to the invention in step b) of the process for the preparation of the asphalt composition, the desired amount of the respective monomeric MDI as thermosetting reactive compound is added under stirring. The desired amount can be in the range of from 0.1 to 10 wt.-% based on the total weight of the composition.

Generally, the amount may also be determined by potentiometric titration in which the amount of reactive groups in an asphalt will be determined and correlated to the equivalent weight of reactive groups of the respective monomeric MDI as thermosetting compound. Titration methods are known in the art and are described in detail in the experimental section.

Generally, asphalt from different suppliers differ in terms of composition depending on which reservoir the crude oil is from, as well as the distillation process at the refineries. However, the cumulated total amount of reactive group can be in the range of from 3, 1 to 4.5 mg KOH/g.

For example, asphalt having a penetration index of 50-70 or 70-100 result in a stoichiometric amount for mMDI to be 0,8 to 1,2% by weight. A further excess of mMDI will be used to react with the newly formed functionalities due to oxidation sensitivity of the asphalt components under elevated temperatures during the preparation of the asphalt composition.

According to the invention the process step c) is performed after step b). The reaction mixture is stirred at a temperature in the range of from 110 to 190° C. for at least 2,5 h, preferably the mixing time is at least 3 h, more preferably the mixing time is at least 3.5 h, most preferably the mixing time is at least 4h. The mixing time can be up to 20 h, preferably the mixing time is not more than 15 h, more preferably the mixing time is not more than 12 h, most preferably the mixing time is not more than 9 h. For example after an addition of from 1 to 1.5 wt. % of the respective mMDI as thermosetting reactive compound the mixing time may be in the range of from 2.5 h to 4 h, for example 3 h or 3.5 h. For example after an addition of from 1.5 to 5.0 wt. % of the respective mMDI as thermosetting reactive compound the mixing time may be in the range of from 4 h to 6 h, for example 4.5 h, 5 h or 5.5 h. For example after an addition of from 5 to 10.0 wt. % of the respective mMDI as thermosetting reactive compound the mixing time may be in the range of from 6 h to 15 h, for example 7 h, 7.5 h, 8 h, 8.5 h, 9 h, 9.5 h, 10 h, 10.5 h, 11 h, 11.5 h, 12 h, 12.5 h, 13 h, 13.5 h, 14 h or 14.5 h.

According to the invention the process for the preparation of an asphalt composition has to be performed under an oxygen atmosphere. Preferably the oxygen concentration in the oxygen atmosphere is in the range of from 1 to 21 Vol.-%, more preferably the oxygen concentration in the oxygen atmosphere is in the range of from 5 to 21 Vol.-%, most preferably the oxygen concentration in the oxygen atmosphere is in the range of from 10 to 21 Vol.-%, for example the process of the present invention is performed under air or under a saturated atmosphere of oxygen.

According to the invention the process for the preparation of an asphalt composition is performed under stirring to allow an intensive mixing of the respective asphalt with the respective thermosetting compound and to maximize the contact with oxygen. Preferably, the stirring energy is in the range of from 1 to 14 W/l, more preferably the stirring energy is in the range of from 2 to 12 W/l, most preferably the stirring energy is in the range of from 4,0 to 10,0 W/l.

Generally, the process is not limited to be performed in one reaction vessel for example a container. The respective asphalt may be reacted with mMDI as thermosetting reactive compound in a first step under the conditions described above for example temperature 110° C. to 190° C. under oxygen for example for one hour. Then the asphalt can be cooled down, transferred to a different reaction vessel subsequent to the transfer heated up so that the total reaction time under oxygen is at least 2.5 h. With out to be bound by this theory it is presently believed that the steps a) and b) (the first step) is to homogenize the mixture and to induce the reaction of the reactive groups of the asphalt with the reactive groups of the respective mMDI as thermosetting reactive compound. The thermosetting reactive compound may be loaded on the asphaltene surfaces. The second or additional heating steps summarized as step c) is to support cross link-ing reaction by oxidation.

Examples of asphalt compositions according to the invention

Z1: 1.0 to 1.8 wt.-% based on the total weight of the composition of monomeric MDI, wherein 18% to 65% by weight based on the total weight of the composition are particles with a sedimentation coefficient in the range of from 8000 to 200000 Svedbergs in a white spirit solvent.

Z2: 1.8 to 3.2 wt.-% based on the total weight of the composition of 4,4-MDI, wherein 22% to 70% by weight based on the total weight of the composition are particles with a sedi-mentation coefficient in the range of from 20000 to 140000 Svedbergs in a white spirit solvent.

Z3: 1.2 to 2.2 wt.-% based on the total weight of the composition of carbodiimide modified momeric MDI, wherein 33% to 68% by weight based on the total weight of the composition are particles with a sedimentation coefficient in the range of from 28000 to 1000000 Svedbergs in a white spirit solvent.

Z4: 1.2 to 1.6 wt.-% based on the total weight of the composition of mMDI, wherein 33% to 85% by weight based on the total weight of the composition are particles with a sedi-mentation coefficient in the range of from 25000 to 150000 Svedbergs in a white spirit solvent.

Z5: 1.5 to 2.0 wt.-% based on the total weight of the composition of monomeric MDI, wherein 22% to 58% by weight based on the total weight of the composition are particles with a sedi-mentation coefficient in the range of from 20000 to 250000 Svedbergs in a white spirit solvent.

Z6: 2.3 to 2.9 wt.-% based on the total weight of the composition of monomeric MDI, wherein 27% to 82% by weight based on the total weight of the composition are particles with a sedi-mentation coefficient in the range of from 12000 to 370000 Svedbergs in a white spirit solvent.

Z7: 3.0 to 3.6 wt.-% based on the total weight of the composition of monomeric MDI, wherein 19% to 62% by weight based on the total weight of the composition are particles with a sedi-mentation coefficient in the range of from 15000 to 135000 Svedbergs in a white spirit solvent.

Z8: 1.6 to 3.5 wt.-% based on the total weight of the composition of carbodiimide modified monomeric MDI with 4,4-MDI in the carbodiimide modified monomeric MDI in the range of from 70 to 80% and carbodiimide in the range of from 20 to 30% in the carbodiimide modified monomeric MDI, wherein 21% to 50% by weight based on the total weight of the composition are particles with a sedimentation coefficient in the range of from 17000 to 500000 Sved in a white spirit solvent.

EXAMPLES AND COMPARATIVE EXAMPLES

General Procedure for the Preparation of an Asphalt Composition 2.5 kg of asphalt in the respective grade according to table 1 was heated up to 140° C. under oxygen atmosphere and stirred at 400 rpm in an oil bath (temperature set up to 150° C.) When the internal temperature of 100° C. was reached, 50 g of the respective thermosetting reactive compound according to table 1 was added to the melted asphalt. The stirring energy varied from 5,6 to 12 W/l. The reaction is further processed at 140° C. for 420 minutes before being cooled down at room temperature. The samples were dispatched into cans for further testing and stored at room temperature.

For comparative examples 1 (#1), 4 (#4) and 6 (#6) 2.5 kg of asphalt with the respective grade according to table 1 was heated up to 140° C. under oxygen atmosphere and stirred at 400 rpm in an oil bath (temperature set up to 150° C.) for up to 420 minutes before being cooled down at room temperature. The samples were dispatched into cans for further testing and stored at room temperature.

For example 5 (#5) 3000g of asphalt 64-22 was heated in an oven at 150° C. for 2 hours in a closed container. The preheated sample had a temperature of 150° C. when the cover was re-moved. Afterwards it was laced in a heating mantle under oxygen atmosphere. With 20% mixer speed the asphalt was heated further with an electric heating mantle using a temperature con-troller in the asphalt to hold the temperature at 150° C.±2° C. When the internal temperature of 150° C. was reached, 60 g of mMDI with a functionality of 2.2 (CDI13) was added to the melted asphalt. The reaction is further processed at 150° C. for 150 Minutes.

For comparative example 2 (#2) 2.5 kg of asphalt 50-70 was heated up to 140° C. under oxygen atmosphere and stirred at 400 rpm in an oil bath (temperature set up to150° C.). When the internal temperature of 100° C. was reached, 50 g of the AS20 (2.0 wt.-%) was added to the melted asphalt. The reaction is further stirred at 140° C. for 420 minutes before being cooled down at room temperature. The sample was then used to determine the particle percentage of the asphalt composition using the analytical ultracentrifuge see results in table 2.

For example 3 (#3) 2.5 kg of asphalt 50-70 was heated up to 140° C. under oxygen atmosphere and stirred at 400 rpm in an oil bath (temperature set up to 150° C.). When the internal temperature of 100° C. was reached, 50 g of the mMDI CDI13 (2.0 wt.-%) was added to the melted asphalt. The reaction is further stirred at 140° C. for 420 minutes before being cooled down at room temperature. The sample was then used to determine the particle percentage of the asphalt composition using the analytical ultracentrifuge see results in table 2.

For example 7 (#7) 2.5 kg of asphalt 70-100 was heated up to 140° C. under oxygen atmosphere and stirred at 400 rpm in an oil bath (temperature set up to 150° C.). When the internal temperature of 100° C. was reached, 50 g of the mMDI CDI13 (2.0 wt.-%) was added to the melted asphalt. The reaction is further processed at 140° C. for 420 minutes before being cooled down at room temperature. The sample was then used to determine the particle percentage of the asphalt composition using the analytical ultracentrifuge see results in table 2.

Thermosetting reactive compound used in the Examples mMDI having a functionality of 2.2, a NCO content of 29.5% and a viscosity of 40 mPats at 25° C. named in the following CDI13 and pMDI having a functionality of 2.7, a NCO content of 31.5% and a viscosity of 210 mPa*s at 25° C. named in the following As20 were used.

mMDI and pMDI with respective functionality are commercially available for example at the following companies: Covestro, BASF SE, Huntsmann etc.

Methods for detecting physical properties in an asphalt or an asphalt composition or asphalt mix The values of the examples are detected according to the respective DIN regulation Detailed description of the used method:

Asphalt Tests

Softening Point DIN EN 1427

Two horizontal disks of bitumen, cast in shouldered brass rings, are heated at a controlled rate in a liquid bath while each supports a steel ball. The softening point is reported as the mean of the temperatures at which the two disks soften enough to allow each ball, enveloped in bitumen, to fall a distance of (25+0,4) [mm].

Rolling Thin Film Oven Test DIN EN 12607-1

Bitumen is heated in bottles in an oven for 85 [min] at 163 [° C.]. The bottles are rotated at 15 [rpm] and heated air is blown into each bottle at its lowest point of travel at 4000 [mL/min]. The effects of heat and air are determined from changes in physical test values as measured before and after the oven treatment.

Dynamic Shear Rheometer (DSR) DIN EN 14770-ASTM D7175

A dynamic shear rheometer test system consists of parallel plates, a means for controlling the temperature of the test specimen, a loading device, and a control and data acquisition system.

Multiple Stress Creep Recovery Test DIN EN 16659-ASTM D7405 This test method is used to determine the presence of elastic response in an asphalt binder under shear creep and recover at two stress level (0,1 and 3,2 [kPa]) and at a specified temperature (50 [° C.]). This test uses the DSR to load a 25 [mm] at a constant stress for 1 [s], and then allowed to recover for 9 [s]. Ten creep and recovery cycles are run at 0.100 [kPa] creep stress followed by ten cycles at 3.200 [kPa] creep stress.

Potentiometric titration method for determining reactive groups in an asphalt:

Acid value

Approx. 0.5-1 g sample was dissolved in 50 ml toluene and titrated potentiometrically with 0.1 mol/l tetrabutylammonium hydroxide solution. A few drops of water can be added to the titration solution to ensure sufficient conductivity. A blank value was determined as well.

Base value

Approx. 0.5-1 g sample was dissolved in 50 ml toluene and titrated potentiometrically with 0.1 mol/l trifluoromethane sulfonic acid solution. A few drops of water can be added to the titration solution to ensure sufficient conductivity. A blank value was determined as well.

Determination of the particle parts of the asphalt composition using the analytical ultracentrifuge (AUC)

For the determination of the particle parts of the asphalt composition, fractionation experiments using analytical ultracentrifugation were conducted. Sedimentation velocity runs using a Beckman Optima XL-I (Beckman Instruments, Palo Alto, USA) were performed. The integrated scanning UV/VIS absorbance optical system was used. A wavelength of 350 nm was chosen. The samples have been measured at a concentration of about 0.2 g/L after dilution in a white spirit solvent (CAS-Nr.: 64742-82-1). In order to detect the soluble and insoluble parts, the cen-trifugation speed was varied between 1000 rpm and 55,000 rpm.

The distribution of sedimentation coefficients, defined as the weight fraction of species with a sedimentation coefficient between s and s+ds, and the concentration of one sedimenting fraction were determined using a standard analysis Software (SEDFIT). The change of the whole radial concentration profile with time was recorded and converted in distributions of sedimentation coefficient g(s). The sedimentation coefficient is in units of Sved (1Sved=10-13 seconds). The particle parts of the asphalt composition were determined by quantifying the light absorption of the fast and slow sedimenting fractions at the used wavelength.

TABLE 1

Results of samples 1 to 7, showing viscosity value before and after modification (without storage), MSCR after short term aging (RFTO) and phase angle values.

| Samples | | Before storage | | MSCR (64° C.) after RTFO | | | | | | Phase Angle (64° C, [°]) |
| --- | --- | --- | --- | --- | --- | --- | --- | --- | --- | --- |
| | | Soft. | Visco | 0.1 kPa | | 1.6 kPa | | 3.2 kPa | | |
| | | Pt (° C.) | (Pas) @ 135° C. | Recovery (%) | Jnr (kPa-1) | Recovery (%) | Jnr (kPa-1) | Recovery (%) | Jnr (kPa-1) | After RTFO |
| #1 | Pen 50/70 | 50 | 0.392 | 1.6 | 0.74 | 0.2 | 0.85 | −1.2 | 0.935 | — |
| #2 | Pen 50/70 2% AS 20 | 65.2 | 1.079 | 34.6 | 0.121 | 32.7 | 0.136 | 28.0 | 0.151 | 71.6 |
| #3 | Pen 50/70 2% CDI13 | 58 | 0.808 | 56.5 | 0.116 | 52.4 | 0.127 | 45.3 | 0.147 | 72.5 |
| #4 | PG64-22 | — | 0.383 | 5 | 2.569 | — | — | 1 | 2.988 | 82.5 |
| #5 | PG64-22 2# CDI13 | — | 1.159 | 76 | 0.093 | — | — | 49 | 0.203 | 66.3 |
| #6 | Pen 70/100 | 47.8 | 0.28 | 5.8 | 0.789 | 2.2 | 1.041 | −0.5 | 1.239 | — |
| #7 | Pen 70/100 2% CDI13 | 66.6 | 0.95 | 58.0 | 0.067 | 55.7 | 0.076 | 50.7 | 0.081 | 65.7 |

TABLE 2

Results of particle parts determination of asphalt composition of examples 3, and 7 and comparative examples 1, 2, and 6 using the analytical ultracentrifuge, the concentration is particles in wt.-% based on the total weight of the respective composition.

| Samples | Component @ N = 50000 U/min | | Component @ N = 1500 U/min | |
| --- | --- | --- | --- | --- |
| | S50 [Sved] | Concentration [wt.-%] | S50 [Sved] | Concentration [wt.-%] |
| #1 | 0.3 | 94 | 21000 | 6 |
| #2 | 0.2 | 75 | 35000 | 25 |
| #3 | 0.5 | 54 | 27513 | 46 |
| #6 | 0,1 | 89 | 99500 | 11 |
| #7 | 0,1 | 72 | 92500 | 28 |

TABLE 3

Storage stability / viscosity stability of comparative samples #1, #2 and sample 3 at high temperature (150° C.)

| Samples | | Storage at 150° C. | | | |
| --- | --- | --- | --- | --- | --- |
| | | 3 days | | 5 days | |
| | | Soft. Pt (° C.) | Visco (Pas) | Soft. Pt (° C.) | Visco (Pas) |
| #1 | Pen 50/70 | — | — | — | — |
| #2 | Pen 50/70 | 67 | 2.021 | 87.8 | 7.317 |
| #3 | Pen 50/70 | 64.6 | 1.88 | 73.6 | 3.732 |

The invention claimed is:

1. An asphalt composition comprising 0.1 to 10.0 wt.-% monomeric methylene diphenyl diisocyanate (MDI) based on the total weight of the composition, wherein the monomeric MDI is carbodiimide modified and wherein the weight percentage of 4,4'-MDI in the carbodiimide modified monomeric MDI is in the range of from 65 to 85% and the weight percentage of carbodiimide is in the range of from 15 to 35% in the carbodiimide modified monomeric MDI; wherein at least 18% by weight based on the total weight of the composition are particles with a sedimentation coefficient above 5000 Sved in a white spirit solvent.

2. The asphalt composition according to claim 1, wherein above 20% by weight based on the total weight of the composition are particles with a sedimentation coefficient in a range of from 10000 to 1000000 Sved in a white spirit solvent.

3. The asphalt composition according to claim 1, wherein the carbodiimide modified monomeric MDI has a functionality in the range of from 2.1 to 2.5.

4. The asphalt composition according to claim 1, wherein the carbodiimide modified monomeric MDI has a viscosity in the range of from 20 to 100 mPa*s at 25° C.

5. The asphalt composition according to claim 1, wherein the amount of the carbodiimide modified monomeric MDI is of from 0.5 to 5.0 wt.-% based on the total weight of the composition.

6. The asphalt composition according to claim 1, wherein the amount of the carbodiimide modified monomeric MDI is of from 0.8 to 3.0 wt.-% based on the total weight of the composition.

7. The asphalt composition according to claim 1, wherein the carbodiimide modified monomeric MDI has iron content in the range of from 1 to 80 ppm.

8. A process for the preparation of an asphalt composition according to claim 1 comprising the following steps:
   a) heating up a starting asphalt to a temperature of from 110 to 190° C.;
   b) adding a desired amount of carbodiimide modified monomeric MDI under stirring to produce a reaction mixture; and
   c) stirring the reaction mixture after step b) at a temperature in the range of from 110 to 190° C. for at least 2.5 h wherein the stirring is carried out under an oxygen atmosphere.

9. A process according to claim 8, wherein the temperature of at least one of the heating and stirring steps is in the range of from 110 to 150° C.

10. A process according to claim 8, wherein the temperature in step a) and step c) are the same and in the range of from 110 to 150° C.

11. A process according to claim 8, wherein the temperature is in the range of from 110 to 150° C. and the reaction mixture is stirred for at least 4 h after the adding step b).

12. A process according to claim 8, wherein the end of the reaction is determined by IR spectroscopy.

13. A method comprising providing the asphalt composition according to claim 1 and incorporating the asphalt composition in an asphalt mix composition.

14. The asphalt composition according to claim 1, wherein the monomeric MDI is present in the composition in an amount of from 0.9 wt % to 3.0 wt % based on the total weight of the composition.

15. The asphalt composition according to claim 1, wherein the monomeric MDI is present in the composition in an amount of from 1.8 wt % to 3.2 wt % based on the total weight of the composition.

* * * * *